Figure 1:
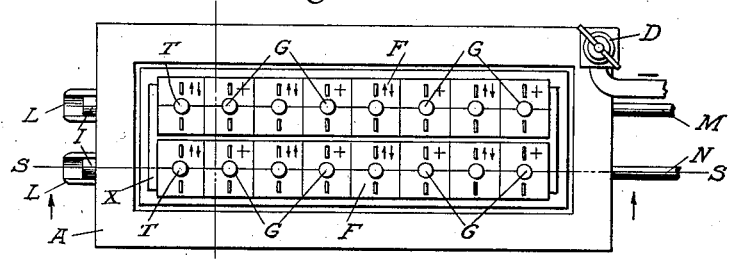

No. 889,098. PATENTED MAY 26, 1908.
H. S. BLACKMORE.
PROCESS OF WINNING ALUMINIUM OR OTHER METALS FROM THEIR COMPOUNDS.
APPLICATION FILED FEB. 25, 1907.

3 SHEETS—SHEET 1.

WITNESSES
INVENTOR.
Henry Spencer Blackmore

No. 889,098. PATENTED MAY 26, 1908.
H. S. BLACKMORE.
PROCESS OF WINNING ALUMINIUM OR OTHER METALS FROM THEIR COMPOUNDS.
APPLICATION FILED FEB. 25, 1907.

3 SHEETS—SHEET 2.

WITNESSES
INVENTOR.

No. 889,098. H. S. BLACKMORE. PATENTED MAY 26, 1908.
PROCESS OF WINNING ALUMINIUM OR OTHER METALS FROM THEIR COMPOUNDS.
APPLICATION FILED FEB. 25, 1907.

3 SHEETS—SHEET 3.

WITNESSES
INVENTOR
Henry Spencer Blackmore

UNITED STATES PATENT OFFICE.

HENRY SPENCER BLACKMORE, OF MOUNT VERNON, NEW YORK.

PROCESS OF WINNING ALUMINIUM OR OTHER METALS FROM THEIR COMPOUNDS.

No. 889,098.     Specification of Letters Patent.     Patented May 26, 1908.

Application filed February 25, 1907. Serial No. 359,304.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Winning Aluminium or other Metals from Their Compounds, of which the following is a specification.

The object of my invention is to facilitate the reduction of metal compounds by the action of electricity in such a manner that a larger yield of metal may be obtained in shorter time and with less expenditure of electrical energy than hitherto, and also to provide a composition, within which the metal is to be reduced, which will be of such selective density that the metals reduced will readily separate therefrom by gravity, so that they may be collected and withdrawn from either above or below the molten constituents without necessarily stopping the process of reduction, whereby the reduction process may be carried on continuously without interruption by adding fresh metal-containing substance to be reduced, and withdrawing the reduced metal from time to time as desired; the principal object being to lower the electrical resistance, and increase the electrical decomposition voltage of the chemical bath above that of the current employed and necessary to reduce the compound of the metal desired with reference to the prior art and decrease the density or gravity of the chemical bath or vehicle for the electrolyte, so that loss is prevented; that a saving of electrical energy over that ordinarily required to maintain fusion of the substances is attained; that a ready settling or separation of the reduced metal in or from the fused chemical bath, thus preventing loss by oxidation, or suspension in the bath, is accomplished; that a saving of electrolytic current, which is ordinarily lost in processes where the voltage point of electrolytic disassociation of the bath approximates that of the disrupting voltage of the metal compound to be reduced, is assured; and that if the viscosity of the bath is increased, so that the more or less flocculent metal oxid supplied to the bath will, during the process of liquefaction, remain floating upon or suspended within the solvent or fusant chemical bath, thus preventing it settling upon the cathode and increasing the electrical resistance as experienced in the prior art is avoided.

My process is particularly adapted to the reduction of the earth metals, such as aluminium, but is not limited thereto, as many other metals may be reduced by substituting other substances containing metal different from that existing combined in the solvent or fusant bath, the metal of which is desired, without departing from the spirit of my invention.

In carrying out my process for the reduction of aluminium from its oxid I proceed as follows, reference being directed to the accompanying drawings which illustrate the preferred form of apparatus which may be employed of which—

Figure 3:
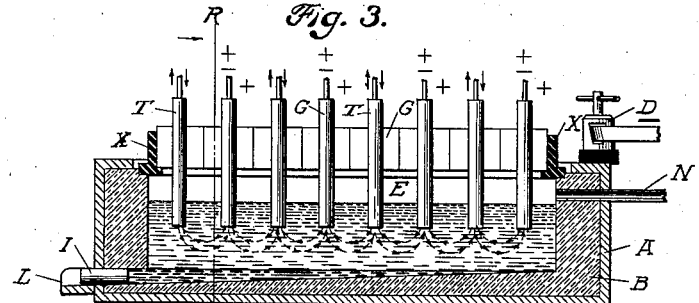
Figure 4:
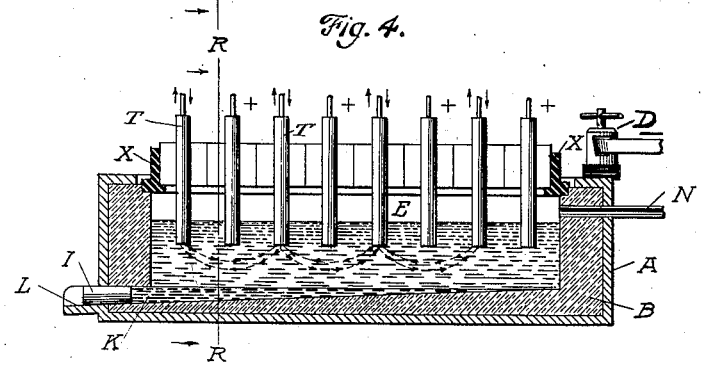
Figure 2:
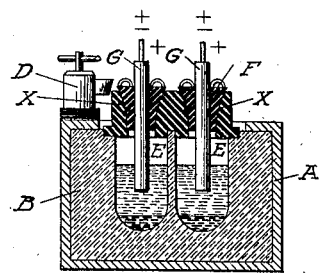
Figure 5:
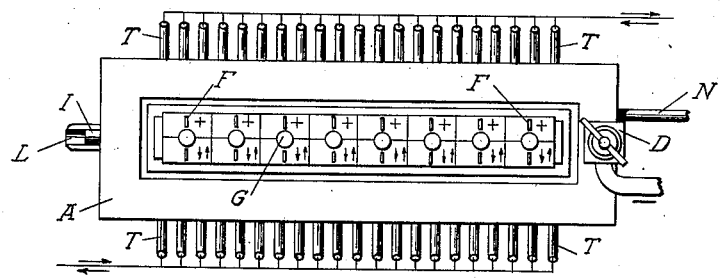
Figure 6:
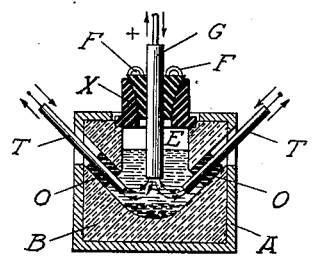
Figure 7:
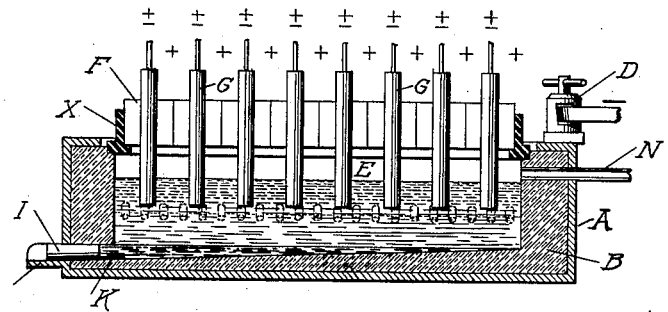
Figure 8:
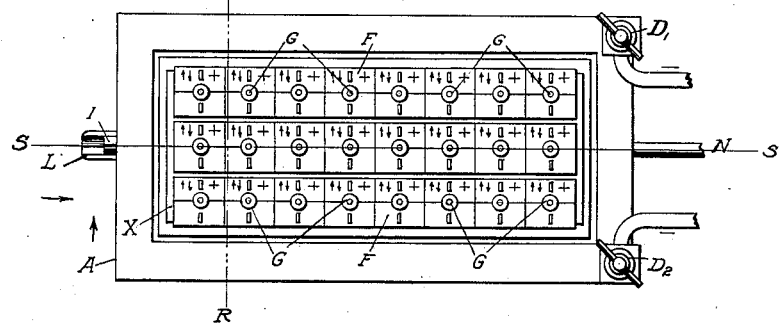
Figure 9:
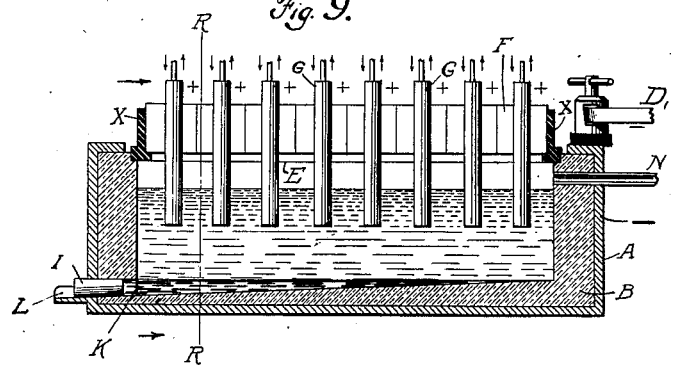
Figure 10:
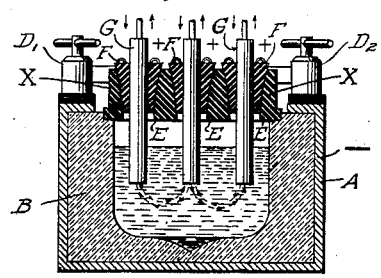

Figure 1 is a plan or top view. Fig. 2 is a vertical section on the line R—R. Figs. 1, 3 and 4. Fig. 3 is a longitudinal vertical section on the line S—S, Fig. 1. Fig. 4, illustrates another method of supplying the two electric currents to and through a furnace. Fig. 5 is a plan or top view of a furnace illustrating another method of supplying the two electric currents to and through the furnace. Fig. 6 is a cross sectional view of Fig. 5 and Fig. 7 is a longitudinal sectional view of the same. Fig. 8 is a plan or top view of a furnace illustrating still another method of supplying the two electric currents to and through the furnace. Fig. 9 is a longitudinal sectional view of Fig. 8, and Fig. 10 is a cross sectional view on the lines R—R, Figs. 8 and 9, all illustrating various means of applying polyphase, alternating, or other non-metal-yielding electric currents to the solvent chemical bath for the purpose of melting the same.

In referring to the figures aforementioned, the letter A designates a box or receptacle, preferably of iron, lined with a substance, such as carbon B, in such a manner as to form a receptacle for the substances to be reduced, and the solvent chemical bath therefor, in which is an electrical conductor and a resistant, preferably of fusible nature, such as calcium and magnesium fluorids in proportion of about one of the former to two of the latter by weight, to which may be preferably added either potassium chlorid *per se* or a mixture of sodium fluorid and potassium chlorid in about equal parts by weight, either the potassium chlorid or the mixture of sodium fluorid and potassium chlorid being added in small quantities for the purpose of facilitating fusion. A fused chemical bath of this character forms a composition of such density that the aluminium reduced in its presence readily settles and collects at the bottom, and also acts as a ready solvent or fusant for the aluminium oxid supplied from time to time and is of such viscosity that any undissolved aluminium oxid will be prevented from settling and accumulating on the cathode, by being floated upon or suspended therein, thus avoiding electrical resistance, which might thus otherwise be occasioned. The material such as calcium and magnesium fluorids, as before stated, is introduced in the apparatus through the openings E, which are closed by the insulated-covers or plugs F passing in the insulating-cover X through which pass the electrodes G, T, which electrodes preferably consist of, or contain, carbon.

The box or receptacle A is connected as cathode in a direct or metal-yielding electric circuit, while the electrodes G are connected as anode, when employing a direct current for electrolyzing or dissociating aluminium oxid, or other metal containing compound. In starting the apparatus I pass through the alternate carbon rods, or electrodes T and G, a polyphase, alternating, or other electric current of such character that it will not yield metal from the substances employed, and start the passage of the electric current between the electrodes G and T by placing between the same pieces of graphitized carbon or heated charcoal and then feed in the mixture of calcium and magnesium fluorids which quickly fuses and accumulates in the carbon lined receptacle until it communicates with the electrodes G and T, through which, after fusion the current of electricity passes between the electrodes, producing heat enough to fuse and maintain fusion of the solvent chemical bath without decomposition, while the graphitized carbon or charcoal floats upon the accumulating fused chemical bath, assuring a non-oxidizing atmosphere. When the solvent bath has become suitably fused and of sufficient volume, I pass a direct, or electrolytic current, through the same between the electrodes G, which constitute the anode, and the carbon lining of the pot B, which is so connected as to constitute the cathode, and add to the fused chemical bath aluminium oxid, which dissolves therein or is liquefied thereby below its normal melting point.

It will be noted that the chemical bath is maintained in a state of fusion by the action of the non-metal-yielding electric current passed between the electrodes G and T, each alternate one of which, constitutes the anode of the direct or metal-yielding current, and that the non-metal-yielding or heating current is passed through the fused conductor in a path disposed at an angle to the path of the direct or metal-yielding current, as indicated by the small arrows passing through the bath between the non-metal-yielding current electrodes or contacts G and T, as shown in Fig. 3.

In Fig. 4 is illustrated a modification whereby the non-metal-yielding current is passed through the fused chemical bath between independent non-metal-yielding electrodes or contacts T, each alternate one of which is connected as the alternate terminus communicating with the opposite poles of an alternating or other non-metal-yielding electric generator.

After the operation is started I introduce from time to time into the molten chemical bath through the openings E by removing the insulated covers, or plugs F, aluminium oxid, which almost immediately becomes liquefied by the action of the solvent bath. As the aluminium oxid becomes liquefied, by the action of the chemical solvent, or fusant bath, it is dissociated by the electrolytic or metal-yielding current of electricity passing between the anodes G and the carbon lining B, which constitutes the cathode, liberating oxygen at the anode which combines with the carbon thereof and escapes as gaseous carbon oxids, while the metallic aluminium is deposited at the cathode and eventually accumulates in a molten mass resting at the bottom upon the furnace lining, and acts thereafter as a molten metal cathode protecting the carbon bottom of the furnace from the corrosive action of the chemical bath. It is advisable in starting a furnace of the aforesaid character to first pour in a small amount of metallic aluminium for the purpose of covering and protecting the bottom of the furnace from the action of corroding or decomposable carbids. By this procedure I am enabled to maintain a fluid condition of the solvent bath and the liquefaction of the metal compound to be reduced below its normal melting point by the action of a polyphase, alternating, or other form of electricity incapable of yielding metal from the substance employed, while the whole of the direct current may be utilized for electrolytic or metal-yielding purposes in dissociating or electrolyzing the metal compound to be reduced, which has been liquefied by the action of the chemical bath below its normal melting point. The great advantage gained by such operation will be seen when the cheapness with which a non-metal-yielding current may be produced, transmitted, and employed for heating purposes as compared with the more expensive direct current, which more expensive direct current may be wholly employed for the purpose of metal yielding and electrolytical dissociation in the liberation of the aluminium or other metal without loss. The aluminium, or other metal, reduced is withdrawn from time to time as desired through the tap-hole K and the trough L by removing the plug I, the gaseous by-products escaping through the conduits M N.

In Figs. 5, 6, and 7, I have illustrated another means whereby the substances are maintained in a molten condition by passing therethrough an alternating, or other non-metal-yielding current of electricity between the electrodes T and G independent of and insulated from the furnace by the insulation O. By the means here illustrated all the vertical carbon electrodes G are connected as anode in the circuit of the direct or metal-yielding current, and simultaneously act as an electrode for the alternating or other non-metal-yielding current employed for the purpose of maintaining the fusion of the ingredients, thereby admitting of a larger electrolytic yield of metal. In these figures, viz., 5, 6, and 7, similar letters of reference constitute corresponding parts with those of 1, 2, 3 and 4.

When the calcium and magnesium fluorids are fused together in the formation of the solvent bath for the metal compounds to be reduced, as hereinbefore described, they appear to unite or assimilate with each other in such a manner as to form a solvent bath for the metal compounds to be reduced, which dissolves the same without further combination or reaction; or in other words, is inert thereto. By adding copper oxid with aluminium oxid, or copper aluminate, to the solvent chemical bath, copper-aluminium alloys may be produced by electrolysis, provided the voltage of the direct or metal-yielding current is sufficient to liberate the more electro-positive metal, viz., aluminium, or by adding aluminates of other metals or mixtures of other oxids of metals, to which aluminium oxid acts as acid, other aluminium alloys may likewise be produced. I can also employ instead of aluminates or compositions of aluminium oxid with other metals, the oxid or oxids of other metals combined with other metals, such as chromates, vanadates, stanates, tungstates, molybdates, etc., the alloys of which, or more electro-negative metal of which, is desired, so long as their reduction is performed in a solvent chemical bath consisting of fluorids of metal other than that of the metal to be reduced, to which may be added metal chlorids to facilitate fusion, which chlorids are of metals requiring a greater voltage to disrupt or dissociate electrically than the different metal compound to be reduced.

The compounds, aforenoted, of metals to be reduced, such as aluminates, may also be of the thio, or other variety, in place of the oxy-compounds, so long as the reduction takes place in a molten bath of fluorids of metals different from that of the metal to be reduced, and which fluorids or additive fluxing agent or fusant require a higher voltage to be electrically dissociated than that required for the reduction of the metal desired, as aforesaid. An individual metal of such compounds to be reduced, containing more than one metal, may be electrically separated by employing an electric current of such selective voltage that the lesser electro-positive metal may be reduced, leaving the other still combined with electro-negative constituents, in which case the original metal compound may be regenerated or produced directly by adding the necessary compound of the metal being reduced, such as the reduction of chromium, vanadium, tin, tungsten, or molybdenum, from the aforesaid compounds and regenerating or reforming them by adding the metal oxids to the molten constituents which combine with the undecomposed portion of the previously electrically acted upon compound of the more electro-positive metal therein remaining, and thus producing more fusible compounds of the metal desired than the oxids *per se:* Of course it goes without saying that if the voltage is sufficiently high both metals of the compound will be reduced producing alloys, or separate metals if either is volatile and the temperature is above its volatilizing point.

My invention, broadly stated, therefore, consists in exposing a molten body of metal compounds to the action of an electric current capable of selectively separating one or more of the metals therefrom without reducing the metal having greater affinity for the electro-negative constituents with which it is combined while replenishing the bath from time to time with a compound of the metal or metals desired, the solvent bath in which the electrolysis of the metals is performed comprising fluorids only of metals which are different from that of the metal to be reduced and requiring a voltage greater to disrupt or dissociate electrically than the metal compound to be reduced within or associated with the aforesaid chemical fluorid or solvent bath.

It has nowhere in the prior art been anticipated to form a chemical bath for the electrical reduction of metals comprising fluorids of metals only which are different from that of the metal to be reduced, and which fluorids are electrically dissociated or decomposed only at a voltage greater than that necessary to reduce the metal desired, which bath liquefies or fuses the metal compound, the metal or alloy of which is desired, below its normal melting point, and which after liquefaction is subjected to the action of a direct or other current of electricity capable of yielding or liberating the metal, whereby the aluminate or other metal compound may be reduced continuously by supplying it from time to time to the fused solvent bath or forming it therein, as increments are reduced to a metallic state, as performed by my process.

A further important and novel feature of my process is that I fuse and maintain fusion of the solvent chemical bath by the action of a polyphase, alternating, or other non-metal-yielding current of electricity passed through the same between electrodes, one of which constitutes or is in common with the anode in the electrolytic circuit, and reduce the metal from its compound contained in the fused bath by the action of an electric current capable of yielding a metal therefrom.

Instead of employing calcium and magnesium fluorids to which may be added sodium fluorid, potassium chlorid, or both, I can employ in conjunction therewith such more electro-positive metal fluorids of lesser density than that of the metal compound to be reduced, as glucinum or beryllium fluorid in cases where particular lightness or low specific gravity of the bath is desired.

In the reduction of refractory metal oxids, such as aluminium oxid or aluminates dissolved in a molten bath of chemicals, as hereinbefore set forth, the refractory metal oxy-compound is dissolved by the action of a fused chemical solvent, and its liquefaction below its normal melting point is accomplished, by the direct solvent action of the fused chemical bath without the expenditure of either heat or electrical energy to accomplish its individual fusion. The liquefaction of the refractory metal oxid is therefore accomplished by means other than the action of an electric current.

It will be noted that the non-metal-yielding current employed for fusing and maintaining the fusion of the bath containing the metal-containing substances, employed in my process, is passed through the fused substances in such a manner that its path is at an angle to the path of the direct or metal-yielding current. The advantage of disposing the non-metal-yielding current employed for fusion purposes at an angle to the direct or metal-yielding current may be seen when it is understood that during the employment of the direct current for fusion and electrolytic purposes jointly, should the direct current be checked for a short period, the fused substances in the path thereof have a tendency to solidify and become non-conductive, thereby insulating the electrodes from each other, occasioning great loss of time and energy to reëstablish the flow of current between the same. Therefore, by so disposing a fusing or non-metal-yielding current that its path is at an angle to the path of the direct or metal-yielding current the maintenance of the fusion of the substances is assured and the difficulty experienced in the prior art obviated. It will also be noted that by the employment of the preferable means of fusion which includes the anode G as a common electrode for the polyphase, alternating, or other non-metal-yielding current, that the fusion may be readily maintained with a reduction of the number of electrodes otherwise necessary, and without interfering with the electrolytic dissociation of the metal compound to be reduced, and also without communicating the alternating or non-metal-yielding current with the cathode.

The advantage gained by applying the non-metal-yielding, alternating, or heating current through anodes independent of the cathodes, is, that when heating currents, such as alternating, are communicated through a cathode the rapid oxidation and reduction due to the alternating conditions of each half cycle, results in producing a semi-resistant condition to the surface of the cathode, due to the transient superficial formation of non-conductive substances, such as oxids, which are of more or less resistant nature to the direct, electrolytic, or metal-yielding current, and which are being alternately transiently formed and decomposed, or oxidized and deoxidized as the case may be, by the rapid alternating current action, which however, does not permanently or practically yield any metal but results only in producing heat energy by passing through increments of the metal-containing substance. It is obvious that by applying the heating current through anodes, anodes and separate electrodes, or separate electrodes independently, that the semi-resistant condition transiently and superficially produced when the cathode is employed in common as alternating or heating electrode, is avoided, thus resulting in a saving of direct or metal-yielding current and consequent greater yield of metal per watt of electrolytic current.

The preferable fluorids which I employ for the solvent or liquefying bath are those which are of more electro-positive metal nature with reference to the electro-negative element, or elements, of the different metal compound to be reduced, and the volatilizable point of which, and electrical dissociating or disrupting point of which, is above that of the metal compound to be reduced, such for instance, in the reduction of aluminium as magnesium or glucinum, (beryllium) fluorid; it being noted that the metal base and compounds are of less gravity than the metal to be reduced, viz., aluminium.

In many cases care must be taken to prevent an oxidizing atmosphere communicating with the molten fluorid bath of metals different from the metal to be reduced, or more electro-positive thereto, to prevent oxidant transformations resulting in loss of fluorin, which can be prevented largely by the presence of carbon or charcoal upon the surface of the molten ingredients.

In the reduction of aluminium from alumina, or aluminium oxid, I prefer to employ as a constituent of the solvent bath, a fluorid or fluorids of metals having greater affinity for oxygen than aluminium, such as calcium, magnesium or beryllium (glucinum), so disposed or associated that their gravity in a fused condition will be such that it will be lighter than the aluminium reduced within its body.

Magnesium fluorid is found to be a most valuable component or constituent of the composition of the electrolyte or vehicle therefor, for the reason that it requires a higher voltage to reduce or electrolyze than the oxids of most metals desired to be reduced, thus assuring permanency of the molten vehicle for the oxid or other electrolyte during electrolysis, without electrical decomposition; or its low gravity, ready fusibility, and comparatively low resistance to the electric current, results in the ready separation or settling of metal electrolytically reduced in the molten chemical bath or electrolyte vehicle, and a saving of power to maintain fusion; it is comparatively less volatile at high temperatures than most fluorids thus effecting a saving of molten electrolyte vehicle or chemical bath over that required for other halogen compounds, it can also be manufactured without difficulty and at a comparatively low cost to that of other halogen compounds; it also is a ready solvent or liquefying agent in a fused state for metal oxids of refractory nature and compounds to be electrolyzed, and does not form carbids in the bath readily and retards contamination with foreign metal contents.

In Figs. 8, 9 and 10 is illustrated another modification of apparatus for carrying out my process, in which all the electrodes through which the alternating or other non-metal-yielding or heating electric current is supplied or conveyed to and from the molten electrolyte are utilized as anodes for the direct or metal-yielding current. This is accomplished by employing two sources from which the direct or metal-yielding current is derived, the carbon lining B of the interior of the furnace being connected to act as common cathode for the direct current derived from both sources, by means of the contacting attachments $D_1$, and $D_2$, respectively; the opposite electrodes or anodes G contacting with the bus bars communicating with the alternating or other non-metal-yielding or heating current; for example, the series of electrodes located central longitudinally of the apparatus on the line S—S Fig. 8, as illustrated in Fig. 10, are connected as one electrode in the alternating, non-metal-yielding or heating circuit, and also as anode for the direct or metal-yielding current circuit communicating with the furnace at $D_1$, while the electrodes running longitudinally on either side are connected as opposite electrode in the alternating, non-metal-yielding, or heating current circuit and as anode for the direct or metal-yielding current circuit communicating with the furnace through the contacting attachment $D_2$. In all other particulars similar letters of reference in Figs. 8, 9 and 10 represent corresponding parts with Figs. 1, 2, 3, 4, 5, 6, and 7.

It will be noted in all cases that the interior or the carbon lining of the furnace constitutes the cathode in a direct or metal-yielding current circuit, communicating with the furnace through the contacting attachments D, $D_1$, and $D_2$.

When the process is carried on as indicated with reference to Figs. 8, 9 and 10, the heating current passes between the central electrodes through the electrolyte to those on either side, and at an angle to the path of the direct or metal-yielding current circuit, and thus maintains fusion of the ingredients independent of the metal-yielding current, while the central series of electrodes also act as anode for one direct current circuit, and the series of electrodes on either side act as anode for a separate direct current circuit, the carbon lining of the furnace acting as a common electrode or cathode for both direct current circuits, while the anodes of both circuits are in common with the alternating, non-metal-yielding, or heating circuit electrodes; by this means the substances to be electrically acted upon can be fused and electrolyzed by the action of heating and metal-yielding electric currents without the necessity of employing any electrodes or contacts for the heating current separate or distinct from the anodes of the metal-yielding current, thereby economizing space, time, wear and tear on the apparatus, and the electricity required to accomplish a given amount of metal yield.

When a direct current of electricity, capable of yielding metal from liquefied substances containing the same, is employed for the dual and common purpose of accomplishing both fusion and electrolysis, such as results in the so-called "Bradley" process, it is found, for example, during the reduction of aluminium, that should the fused bath become depleted of aluminium oxid by electrolysis, that the resistance quickly rises, resulting in the burning or volatilization of the fused bath resulting in loss as well as electrically overloading and overheating other furnaces when connected in series, to avoid which a large number of men have to be employed to rush in and refeed or resupply such furnaces which have become depleted of aluminium oxid, at once. This is not the case with my process where the direct current can be cut off until the furnace is refed at leisure with aluminium oxid, the chemical bath being maintained in a state of fusion by the alternating, non-metal-yielding or heating current separate and independent of the electric current capable of yielding metal. Also when a direct or metal-yielding current is employed for both fusion and electrolysis the bath is not uniformly heated, but is hottest at the anodes, while the alternating, non-metal-yielding, or other heating current, as employed in this process, heats equally throughout the mass of ingredients, and thus saves the anodes from combustion by overheating and producing an even fusion of the ingredients.

It is well known that it requires a certain current density of electricity to fuse and maintain fusion of certain substances, and that when a direct current is employed for that purpose that it impinges upon the anodes and the heat is concentrated at that point, as the current travels in one direction only, and hence, the anodes become over heated, resulting in loss of energy, and are consumed by oxidation where exposed to the atmosphere also resulting in loss of carbon anodes unless artificially cooled by water-jacket or otherwise to prevent combustion; this is a well known and unavoidable difficulty met with during the employment of direct current for the dual purpose of fusion and electrolysis in electric smelting processes and much time and money has been expended to obviate it; if however, an alternating current or a non-metal-yielding current is employed for fusion and maintenance thereof, the current traveling in different or multiple directions equally divides the heat energy between the electrodes, two or more, impinging equally on all, and hence, while the fusion effect is accomplished, less heat is generated at each of the anodes than when a direct current is used, and also less current of this character is necessary, as the feed ingredients are more evenly heated and convection is not depended upon to such a large extent for the diffusion of heat throughout the ingredients. If therefore, the heat of the fusion current is divided between electrodes, then a part of the heat formerly liberated or evolved at the anodes alone must be liberated or evolved at other points in the ingredients, and hence when the anodes of direct current (which is only employed to liberate metal) are employed in common with the fusion current of alternating, polyphase, or non-metal-yielding nature, they will not become so highly heated in accomplishing the same work as when employing a direct current alone.

The term "metal-yielding" current employed throughout the specification and claims relates to an electric current capable of yielding metal from fluid substances containing the same and the term "non-metal-yielding" current to an electric current incapable ordinarily of yielding metal from liquefied metal-containing substances, such as an alternating or polyphase electric current, and which currents are specially adapted for heating purposes.

I am aware that metals have been reduced electrically from compounds thereof associated with like-metal fluorids and fluorids of more electro-positive metals, such as the electrolysis of aluminium oxid, producing metallic aluminium, in the presence of aluminium fluorid and fluorids of sodium and potassium; in this case, however, the like-metal fluorid, such as aluminium fluorid, increases the electrical resistance, the fusing point, and the density of the chemical bath, and being inert, it lends nothing materially to the ingredients to facilitate the reduction of the metal compound to be reduced. In my process the electrical resistance, density, and fusing point, of the bath is reduced by employing halogen-containing compounds of metals only which are different and distinct from the metal to be reduced, whereby the density of the ingredients differ more widely from that of the metal to be reduced, and allow the metal to readily separate by gravity, when liberated, so that it can be collected and withdrawn from above or below the same from time to time as desired without interfering with the process of reduction; also the fusing point and electrical resistance of the different metal fluorids being lower than that of the like-metal fluorid, less heating current is required to maintain fusion of the ingredients.

I am also aware that metals have been chemically reduced or liberated from halogen-containing compounds thereof by the action of an ion evolved or generated during the electrolysis of a different metal compound associated therewith, and also that metals have been chemically reduced or liberated from their oxids and the like by the action of an ion evolved or generated during the electrolysis of halogen-containing compounds of different metals associated therewith, and that halogen-containing compounds have been electrolyzed yielding their metal content directly by electrolysis while the metal-containing halogen compound was regenerated by the action of the halogen ion, simultaneously evolved or generated during the electrolytic reduction of the metal, on a like metal oxid in the presence of carbon, but in these processes the metal desired is either yielded or liberated from halogen containing compounds directly or indirectly by the action of a chemical liberating agent derived by the electrolysis of a foreign substance associated therewith, or the metal desired is derived from a foreign substance associated with the halogen-containing compounds by the action of an ion resulting from the electrolysis or electrolytic decomposition of the halogen compound, or by the direct electrolysis or electrolytic decomposition of the halogen-containing compound, in either event of which the halogen-containing compound is decomposed or the halogen liberated by either chemical or electrolytic means, resulting in loss of the original halogen-containing chemical bath and requiring a voltage high enough to liberate the halogen from the halogen-containing compound resulting in loss of chemical bath and power. In the present process the halogen-containing compounds present in the original bath are inert to the cation or ions, or metal electrolytically reduced and the halogen-containing chemical compound remains practically constant in composition in the bath and is not lost by either chemical or electrical decomposition as in the processes of the prior art noted, the voltage of the electrolytic current being below that required to liberate the halogen from the halogen-containing metal compounds present, and the electrolytic cation or metal desired being inert to the aforesaid halogen-metal-containing compound does not decompose or injure the same. The term "inert" employed herein in reference to the electrolytic ion is intended to imply and does imply that it neither decomposes or combines with, nor is decomposed by the halogen-containing metal compound or the chemical constituents of the solvent chemical bath or vehicle for the metal compound to be electrolytically reduced or decomposed or from which the metal desired is electrolytically liberated or yielded, and by the expression "inert to the electrolytic cation" as employed in the claims, is meant that in the operation of the process, as disclosed in the specification, the halogen-containing compound does not react with the electrolytic cation.

The presence of carbon as anode, electrode, or otherwise, in contact with or presence of the metal-containing substance to be reduced, in conjunction with the electric current, in cases where the electro-negative constituent of the metal to be reduced combines with, or has an affinity for carbon, augments and facilitates the electrical reduction by generating heat during union of the electro-negative content of the metal compound to be reduced, such as oxygen in aluminium oxid, therewith, thus economizing both the electrolyzing and heating currents of the electricity employed. If the electrode consists of a material which is not acted upon by the electro-negative constituents evolved during reduction, this augmenting action, of course, is not available. Where the electrical or electrolytical reduction is mentioned in this specification and claims, it is intended to imply, include, or cover the condition of reduction with, or without, the augmentation of electrodes or substances capable of combining with the electro-negative constituents of the substance, the metal content of which is to be reduced to a metallic state or condition.

Having now described my invention, what I claim as new and desire to secure by Letters Patent is:—

1. The process of winning aluminium or other metal from substances containing the same, which consists in electrically liberating the metal from its compound with elements other than halogens, while associated with halogen-containing compounds of only such metals as are different from the metal to be reduced, by subjecting the metal-containing substance to the combined action of a metal-yielding electric current, of a voltage below that necessary to liberate the halogen from the different metal compound, but capable of liberating the metal desired, and a non-metal-yielding current capable of fusing and maintaining fusion of the ingredients communicated through the anodes.

2. The process of winning aluminium or other metal from substances containing the same, which consists in liberating the metal from its compound with elements other than halogens, by electrolysis, while associated with halogen-containing compounds of only such metals as are different from the metal to be reduced, one of which is magnesium.

3. The process of winning aluminium or other metals from substances containing the same, which consists in electrically liberating the metal from its compound with elements other than halogen, while associated with fluorin-containing compounds of only such metals as are different from the metal to be reduced, by subjecting the metal-containing substance to the action of an electric current of a voltage below that necessary to liberate fluorin from the different metal compound, but capable of liberating the metal desired, and a non-metal-yielding current capable of fusing and maintaining fusion of the ingredients communicated through the anodes.

4. The process of winning aluminium or other metal from substances containing the same, which consists in liberating the metal from its compound with elements other than halogens, by electrolysis, while associated with fluorin-containing compounds of only such metals as are different from the metal to be reduced, one of which is magnesium.

5. The process of winning aluminium or other metal from substances containing the same, which consists in electrically liberating the metal from its compounds, with elements other than halogens, while associated with fluorid of only such metals as are different from the metal to be reduced, by subjecting the metal-containing substance to the action of an electric current of a voltage below that necessary to liberate fluorin from the different metal fluorid, but capable of liberating the metal desired, and a non-metal-yielding current capable of fusing and maintaining fusion of the ingredients communicated through the anodes.

6. The process of winning aluminium or other metal from substances containing the same, which consists of liberating the metal from its compounds with elements other than halogens, by electrolysis, while associated with fluorid of only such metals as are different from the metal to be reduced, one of which is magnesium.

7. The process of winning aluminium or other metal from substances containing the same, which consists in liberating the metal from its compounds with elements other than halogens, while associated with halogen-containing compounds of only such metals as are different from the metal to be reduced, one of which is magnesium fluorid, by subjecting the metal-containing substance to the action of an electric current of a voltage below that necessary to liberate the halogen from the different metal compound, but capable of liberating the metal desired.

8. The process of winning aluminium or other metal from substances containing the same, which consists of liberating metal from its compounds with elements other than halogen, by electrolysis, while associated with halogen-containing compounds of only such metals as are different from the metal to be reduced, one of which is magnesium.

9. The process of winning aluminium from substances containing the same, which consists of electrically liberating aluminium from its compounds with elements other than halogens, while associated with halogen-containing compounds of only such metals as are different from aluminium, by subjecting the aluminium-containing substance to the action of an electric current of a voltage below that necessary to liberate the halogen from the different metal compounds, but capable of liberating aluminium, and a non-metal-yielding current capable of fusing and maintaining fusion of the ingredients communicated through the anodes.

10. The process of winning aluminium from substances containing the same, which consists of subjecting aluminium combined with elements other than halogens, to electrolysis, while associated with halogen-containing compounds of only such metals as are different from aluminium, one of which is magnesium.

11. The process of winning metal from its oxy-compounds, which consists in electrically liberating the metal from its oxy-compound containing elements other than halogens, while associated with halogen-containing compounds of only such metals as are different from the metal to be reduced, by subjecting the metal oxy-compound to the action of an electric current of a voltage below that necessary to liberate the halogen from its different metal compound, but capable of liberating the metal desired.

12. The process of winning metal from its oxy-compounds, which consists in electrolyzing a metal oxy-compound containing elements other than halogen, while associated with halogen-containing compounds of only such metals as are different from the metal desired and which halogen-containing compounds are inert to the electrolytic cation.

13. The process of winning metal from its oxy-compounds, which consists in electrically liberating the metal from its oxy-compound containing elements other than halogens, while associated with fluorin-containing compounds of only such metals as are different from the metal to be reduced, by subjecting the metal oxy-compound to the action of an electric current of a voltage below that necessary to liberate fluorin from its different metal compounds, but capable of liberating the metal desired.

14. The process of winning metal from its oxy-compounds, which consists in electrolyzing a metal oxy-compound containing elements other than halogen, while associated with fluorin-containing compounds of only such metals as are different from the metal desired and which fluorin-containing compounds are inert to the electrolytic cation.

15. The process of winning metal from its oxy-compounds, which consists in electrically liberating the metal from its oxy-compound containing elements other than halogens, while associated with fluorid of only such metals as are different from the metal to be reduced, by subjecting the metal oxy-compound to the action of an electric current of a voltage below that necessary to liberate fluorin from the different metal fluorid, but capable of liberating the metal desired.

16. The process of winning metal from its oxy-compounds, which consists in electrolyzing a metal oxy-compound containing elements other than halogen, while associated with fluorid of only such metal as is different from the metal desired and which fluorid is inert to the electrolytic cation.

17. The process of winning metal from its oxid, which consists in electrically liberating the metal from its oxid, while associated with halogen-containing compounds of only such metals as are different from the metal to be reduced, by subjecting the metal oxid to the action of an electric current of a voltage below that necessary to liberate the halogen from its different metal compound, but capable of liberating the metal desired from oxygen.

18. The process of winning metal from its oxid, which consists in electrolyzing a metal oxid, while associated with halogen-containing compounds of only such metals as are different from the metals desired and which halogen-containing conpounds are inert to the electrolytic cation.

19. The process of winning metal from its oxid, which consists in electrically liberating the metal from its oxid, while associated with fluorin-containing compounds of only such metals as are different from the metal to be reduced, by subjecting the metal oxid to the action of an electric current of a voltage below that necessary to liberate fluorin from its different metal compounds, but capable of liberating the metal desired.

20 The process of winning metal from its oxid, which consists in electrolyzing a metal oxid, while associated with fluorin-containing compounds of only such metals as are different from the metal desired and which fluorin-containing compounds are inert to the electrolytic cation.

21. The process of winning metal from its oxid, which consists in electrically liberating the metal from its oxid, while associated with fluorid of only such metals as are different from the metal to be reduced, by subjecting the metal oxid to the action of an electric current of a voltage below that necessary to liberate fluorin from the different metal fluorid but capable of liberating the metal desired.

22. The process of winning metal from its oxid, which consists in electrolyzing a metal oxid, while associated with fluorid of only such metal as is different from the metal desired and which fluorid is inert to the electrolytic cation.

23. The process of winning aluminium, which consists in electrically liberating aluminium from its oxy-compounds containing elements other than halogens, while associated with halogen-containing compounds of only such metals as are different from aluminium, by subjecting the aluminium oxy-compounds to the action of an electric current of a voltage below that necessary to liberate the halogen from its different metal compounds, but capable of liberating aluminium.

24. The process of winning aluminium, which consists in electrolyzing an aluminium oxy-compound containing elements other than halogen, while associated with halogen-containing compounds of only such metals as are different from aluminium and which halogen-containing compounds are inert to aluminium.

25. The process of winning aluminium, which consists in electrically liberating aluminium from its oxid while associated with halogen-containing compounds of only such metals as are different from aluminium, by subjecting the aluminium oxid to the action of an electric current of a voltage below that necessary to liberate the halogen from its different metal compounds, but capable of liberating aluminium from oxygen.

26. The process of winning aluminium, which consists in liberating it from its oxid by electrolysis, while associated with halogen-containing compounds of only such metals as are different from aluminium and which halogen-containing compounds are inert to aluminium.

27. The process of winning aluminium, which consists in electrically liberating the same from its oxid, while associated with fluorin-containing compounds of only such metals as are different from aluminium, by subjecting the aluminium oxid to the action of an electric current of a voltage below that necessary to liberate fluorin from its different metal compounds, but capable of liberating aluminium from oxygen.

28. The process of winning aluminium, which consists in liberating aluminium from its oxid by electrolysis, while associated with fluorin-containing compounds of only such metals as are different from aluminium and which fluorin-containing compounds are inert to aluminium.

29. The process of winning aluminium, which consists in electrically liberating aluminium from its oxid, while associated with halogen-containing compounds of only such metals as are different from aluminium, one of which is magnesium fluorid, by subjecting the aluminium oxid to the action of an electric current of a voltage below that necessary to liberate the halogen from its different metal compounds, but capable of liberating aluminium from oxygen.

30. The process of winning aluminium, which consists in liberating aluminium from its oxid by electrolysis, while associated with fluorin-containing compounds of only such metals as are different from aluminium, one of which is magnesium.

31. The process of winning aluminium, which consists in liberating aluminium from its oxid while associated with fluorid of only such metals as are different from aluminium and which fluorid is inert to aluminium, by subjecting the aluminium oxid to the action of an electric current of a voltage below that necessary to liberate fluorin from the different metal fluorid, but capable of liberating aluminium from oxygen.

32. The process of winning aluminium, which consists in liberating aluminium from its oxid by electrolysis, while associated with fluorid of only such metal as is different from aluminium, one of which is magnesium.

33. The process of winning aluminium, which consists in liberating aluminium from its oxid by electrolysis, while associated with magnesium, calcium, and sodium fluorids.

34. The process of winning aluminium, which consists in liberating aluminium from its oxid by electrolysis, while associated with magnesium, calcium, and sodium fluorids, and potassium chlorid.

35. The process of winning aluminium, which consists in liberating aluminium from its oxid by electrolysis, while associated with magnesium and calcium fluorid.

36. The process of winning aluminium, which consists in liberating aluminium from its oxid by electrolysis, while associated with magnesium fluorid.

37. The process of winning metal from substances containing the same, which consists in exposing a metal-containing substance to the action of non-metal-yielding and metal-yielding electric currents, passed through increments of the same, one or more anodes of which act as electrodes in common with the non-metal-yielding current.

38. The process of winning aluminium from substances containing the same, which consists in exposing the aluminium-containing substance to the action of non-metal-yielding and metal-yielding electric currents, passed through increments of the same, one or more anodes of which act as electrodes in common with the non-metal-yielding current.

39. The process of winning metal from substances containing the same, which consists in passing a non-metal-yielding electric current through fused metal-containing substances between anodes of separate, multiple, metal-yielding electric circuits communicating with the fused substances.

40. The process of winning aluminium from substances containing the same, which consists in passing a non-metal-yielding electric current, through fused aluminium-containing substances, between anodes of separate, multiple, metal-yielding electric circuits communicating with the fused aluminium-containing substances.

41. The process of winning metals from substances containing the same, which consists in passing a plurality of direct or metal-yielding electric currents through fused metal-containing substances from a common cathode to separate anodes, and supplying and discharging a non-metal-yielding or heating electric current to and from the separate anodes through intervening increments of a metal-containing substance.

42. The process of winning aluminium from substances containing the same, which consists in passing a plurality of direct or metal-yielding electric currents through fused aluminium-containing substances from a common cathode to separate anodes, and supplying and discharging a non-metal-yielding or heating electric current to and from the separate anodes, through intervening increments of the aluminium-containing substance.

43. The process of winning metal from substances containing the same, which consists in maintaining fusion of metal-containing substances by passing a non-metal-yielding or heating electric current through increments thereof between electrodes or contacts which are in common with anodes of direct or metal-yielding electric currents.

44. The process of winning aluminium from substances containing the same, which consists in maintaining fusion of aluminium-containing substances by passing a non-metal-yielding or heating electric current through increments thereof between electrodes or contacts which are in common with anodes of direct or metal-yielding electric currents.

45. The process of winning metals from substances containing the same, which consists in subjecting metal-containing substances to electrolysis, while maintaining the said substance in a fluid condition by the action of an alternating or non-metal-yielding current of electricity, passed through increments of the substance between anodes.

46. The process of winning aluminium from substances containing the same, which consists in subjecting the aluminium-containing substance to electrolysis, while maintaining said substance in a fluid condition, by action of an alternating, or non-metal-yielding current of electricity passed through increments of the substance between anodes.

47. The process of maintaining fusion of substances for electrolytically winning metal from compounds containing the same, which consists in passing through increments of the metal-containing substance, a non-metal-yielding or heating electric current, communicated thereto through an anode in the electrolytic circuit.

48. The process of maintaining fusion of substances for electrolytically winning aluminium from its compounds, which consists in passing through increments of the aluminium-containing substance, a non-metal-yielding or heating electric current, communicated thereto through an anode in the electrolytic circuit.

49. The process of winning aluminium, which consists in liberating aluminium from its oxid by electrolysis, while associated with fluorid of only such metal as is different from aluminium and which fluorid is inert to aluminium.

In testimony whereof I affix my signature in presence of two witnesses.

HENRY SPENCER BLACKMORE.

Witnesses:
E. M. HOLMES,
J. R. NOTTINGHAM.